United States Patent
Masukawa et al.

(10) Patent No.: US 9,774,671 B2
(45) Date of Patent: Sep. 26, 2017

(54) PARALLEL PROCESSING SYSTEM AND OPERATION METHOD OF PARALLEL PROCESSING SYSTEM

(75) Inventors: Kazunori Masukawa, Tokyo (JP); Masahiro Taeda, Tokyo (JP); Yoshikatsu Kuroda, Tokyo (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 344 days.

(21) Appl. No.: 14/008,023

(22) PCT Filed: Feb. 24, 2012

(86) PCT No.: PCT/JP2012/054658
§ 371 (c)(1),
(2), (4) Date: Sep. 27, 2013

(87) PCT Pub. No.: WO2012/132692
PCT Pub. Date: Oct. 4, 2012

(65) Prior Publication Data
US 2014/0019509 A1 Jan. 16, 2014

(30) Foreign Application Priority Data
Mar. 29, 2011 (JP) .................. 2011-073163

(51) Int. Cl.
*G06F 15/16* (2006.01)
*H04L 29/08* (2006.01)
(Continued)

(52) U.S. Cl.
CPC ............ *H04L 67/1095* (2013.01); *G06F 9/52* (2013.01); *G06F 9/544* (2013.01); *G06F 15/17331* (2013.01)

(58) Field of Classification Search
None
See application file for complete search history.

(56) References Cited

U.S. PATENT DOCUMENTS 5,600,843 A  2/1997  Kato et al.
5,765,202 A  6/1998  Kusano et al.
(Continued)

FOREIGN PATENT DOCUMENTS

EP  0 269 995  6/1988
JP  63-238653  10/1988
(Continued)

OTHER PUBLICATIONS

Japanese Decision to Grant a Patent issued Dec. 12, 2014 in corresponding Japanese Patent Application No. 2011-073163 with partial English translation.
(Continued)

*Primary Examiner* — Krista Zele
*Assistant Examiner* — Mohammad Yousuf A Mian
(74) *Attorney, Agent, or Firm* — Wenderoth, Lind & Ponack, L.L.P.

(57) ABSTRACT

A parallel processing system includes a plurality of computers accessibly connected through a network, and distributedly executing a plurality of processes. Each of the plurality of computers is composed of an operation processing unit configured to execute an allocated process, a local memory group having a first area and a second area and an I/O control circuit. The operation processing unit executes the allocated process by using the first area as an access destination in a first period and, and executes the allocated process by using the second area as the access destination in a second period subsequent to the first period. The I/O control circuit is composed of an updating section configured to update data stored in the local memory group to the latest data by carrying out communication among the computers. The updating section updates the data stored in the first area in the second period.

8 Claims, 10 Drawing Sheets

(51) Int. Cl.
*G06F 15/173* (2006.01)
*G06F 9/52* (2006.01)
*G06F 9/54* (2006.01)

(56) References Cited

U.S. PATENT DOCUMENTS

| | | | | |
|---|---|---|---|---|
| 5,842,035 A | * | 11/1998 | Nishikawa | G06F 15/8007 712/14 |
| 6,785,800 B1 | | 8/2004 | Yamaura et al. | |
| 8,359,446 B2 | * | 1/2013 | Huetter | G06F 5/16 711/151 |
| 2010/0293412 A1 | * | 11/2010 | Sakaguchi | G06F 11/0715 714/17 |

FOREIGN PATENT DOCUMENTS

| | | |
|---|---|---|
| JP | 03-105583 | 5/1991 |
| JP | 04-114262 | 4/1992 |
| JP | 2559918 | 12/1996 |
| JP | 10-143486 | 5/1998 |
| JP | 2001-84229 | 3/2001 |
| JP | 4260962 | 4/2009 |
| RU | 2 202 123 | 4/2003 |

OTHER PUBLICATIONS

Decision to Grant a Patent issued Apr. 16, 2015 in corresponding Russian Application No. 2013143837/08 (with partial English translation).

International Search Report issued May 29, 2012 in International (PCT) Application No. PCT/JP2012/054658.

International Preliminary Report on Patentability and Written Opinion of the International Searching Authority issued Oct. 2, 2013 in International (PCT) Application No. PCT/JP2012/054658.

\* cited by examiner

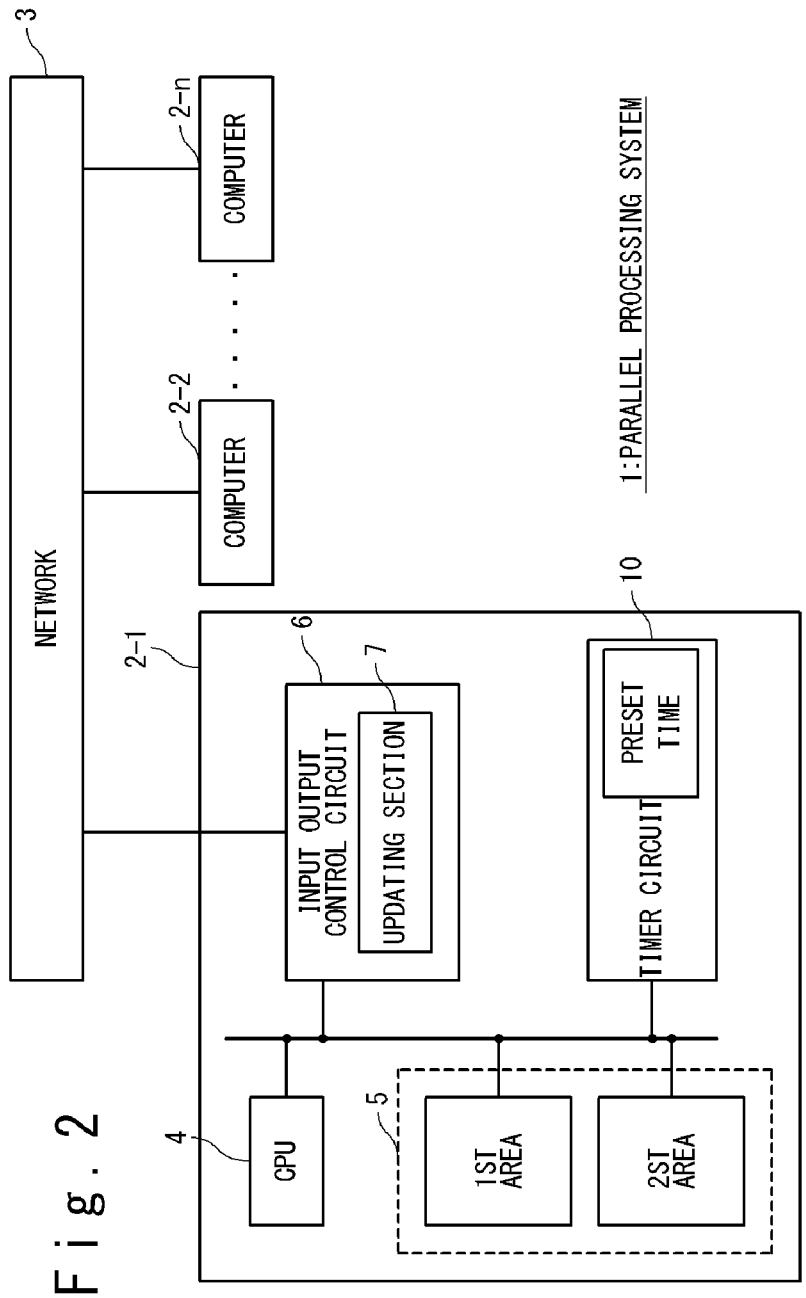

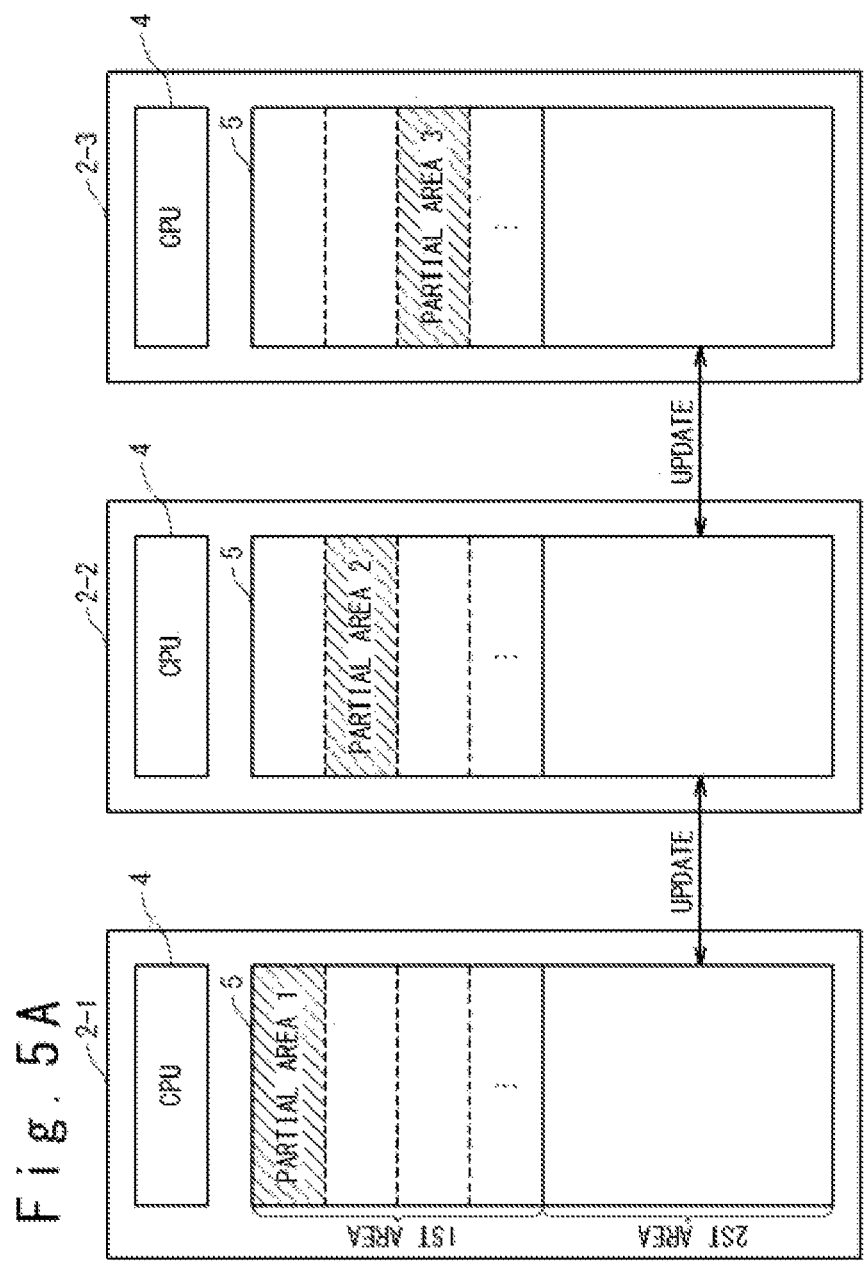

PARALLEL PROCESSING SYSTEM AND OPERATION METHOD OF PARALLEL PROCESSING SYSTEM

TECHNICAL FIELD

The present invention is related to a parallel processing system and an operation method of the parallel processing system.

BACKGROUND ART

A parallel processing system is sometimes used to speed up calculation processing by a computer. In the parallel processing system, processes are executed in parallel by a plurality of computers. As the parallel processing system, a shared memory type parallel processing system and a distributed memory type parallel processing system are known.

FIG. 1A is a conceptual diagram showing an example of the shared memory type parallel processing system. As shown in FIG. 1A, the parallel processing system 100 is composed of a plurality of computers 102 (102-1 to 102-$n$) and a shared memory 101. In the parallel processing system 100, a plurality of processes are respectively allocated to the plurality of computers 102 (102-1 to 102-$n$). Each of the plurality of computers 102 executes the allocated process while accessing the shared memory 101.

On the other hand, FIG. 1B is a conceptual diagram showing an example of the distributed memory type parallel processing system. As shown in FIG. 1B, the parallel processing system 100 is composed of a plurality of computers 102-1 to 102-$n$. The distributed memories 103 (103-1 to 103-$n$) are respectively provided for the computers 102. Each computer 102 executes the allocated process while accessing the distributed memory 103. In the parallel processing system 100, the synchronization processing is required to equalize the data stored in the distributed memories 103 among the plurality of computers 102. That is, when the execution of the allocated process ends in each computer 102, communication is carried out among the plurality of computers 102 to copy a processing result stored in the distributed memory 103 of each computer 102 to the distributed memories 103 of the other computers 102. After that, each computer 102 executes a process allocated next.

A related technique is disclosed in Patent Literature 1 (Japanese Patent No. 2,559,918), in which a plurality of computers independently operating are connected to configure the distributed memory type parallel processing system. The distributed memory type parallel processing system is composed of a synchronization request register section configured to issue a synchronization request from each computer independently and hold a synchronization request signal; a synchronization determining section configured to determine the synchronization request signals from the synchronization request register sections of all the computers; a synchronization distributing section configured to distribute the determination result to all the computers; a synchronization detection register section configured to perform synchronization detection from the distributed determination results; a status request register section provided for each computer, to independently issue a status request of whether each computer executes a process in a predetermined manner, and to hold a status request signal; a status determining section to determine whether the status request signals from all the status request registers of all the computers are present; a status distributing section configured to distribute the determination result to all the computers; and a status detection register section to carry out a status detection based on the determination result distributed from the status distributing section and the determination result distributed from the synchronization distributing section. Thus, the statuses of all the computers can be detected when the synchronization is established among all the computers.

CITATION LIST

[Patent Literature 1] Japanese Patent No. 2,559,918

SUMMARY OF THE INVENTION

As shown in FIG. 1A, in the shared memory type parallel processing system 100, the plurality of computers 102 access the same shared memory 101. Therefore, there is a case that accesses compete among the plurality of computers 102. When the access competition occurs frequently, the process performance cannot be improved.

On the other hand, as shown in FIG. 1B, in the distributed memory type parallel processing system 100, the access competition does not occur. However, the synchronization process must be carried out. To carry out the synchronization process, each computer 102 need to have a complicated controlling function.

Therefore, one object of the present invention is to provide a parallel processing system and an operation method of the parallel processing system, in which a processing performance can be improved without providing a complicated controlling function.

A parallel processing system according to the present invention is composed of a plurality of computers accessibly connected to each other through a network, and configured to distributedly execute a plurality of processes. Each of the plurality of computers is composed of an operation processing unit configured to execute an allocated process, a local memory group having a first area and a second area and an I/O control circuit. The operation processing unit executes the allocated process by using the first area as an access destination in a first period, and executes the allocated process by using the second area as the access destination in a second period subsequent to the first period. The I/O control circuit is composed of an updating section configured to update data stored in the local memory group to the latest data by carrying out communication among the plurality of computers. The updating section updates the data stored in the first area in the second period.

According to the present invention, because each computer executes the allocated process by using the local memory group as the access destination, the competition of the memory access never occurs. Also, in each computer, the process is executed by using the first area as the access destination in the first period. Then, in the second period, the process is executed by using the second area as the access destination. Also, the data stored in the first area is updated in the second period. That is, in the second period, the execution of the process using the second area as the access destination and the updating of the first area are performed in parallel. In order to carry out the synchronization process, it is not necessary to stop the execution of the process in each computer. Therefore, it is possible to improve the process performance in the parallel processing system.

An operation method of the parallel processing system according to the present invention is a method of operating a parallel processing system which is composed of a plurality of computers accessibly connected with each other through a network. Each of the plurality of computers is composed of an operation processing unit which executes the allocated process, a local memory group having a first area and a second area and an I/O control circuit. The operation method includes executing a process by the operation processing unit by using the first area as an access destination in a first period; executing the process by the operation processing unit by using the second area as the access destination in a second period subsequent to the first period; and updating data stored in the local memory group to the latest data by the I/O control circuit by carrying out communication among the plurality of computers. The updating includes updating the data stored in the first area in the second period.

According to the present invention, the parallel processing system and the operation method of the parallel processing system are provided which can improve the process performance without providing a complicated controlling function.

BRIEF DESCRIPTION OF THE DRAWINGS

FIG. 2 is a diagram schematically showing the parallel processing system according to a first embodiment;

FIG. 5A is a diagram showing an operation example in a first period;

DESCRIPTION OF EMBODIMENTS

Figure 1A:
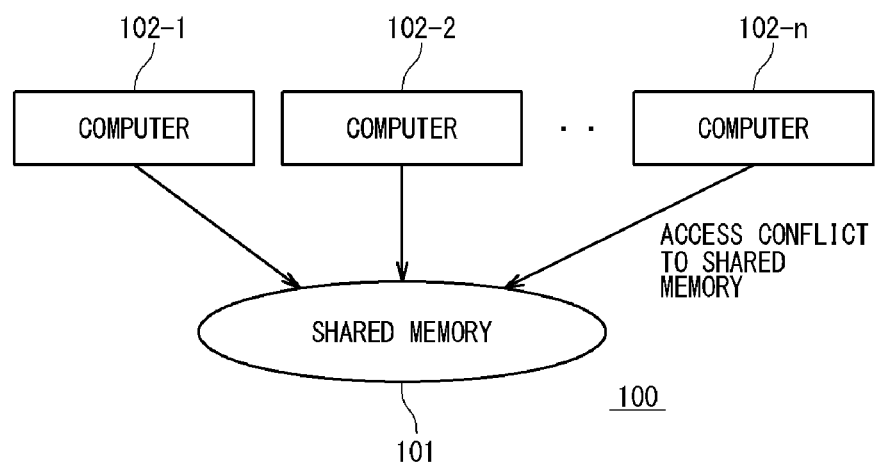
FIG. 1A is a conceptual diagram showing an example of a shared memory type parallel processing system.
Figure 1B:
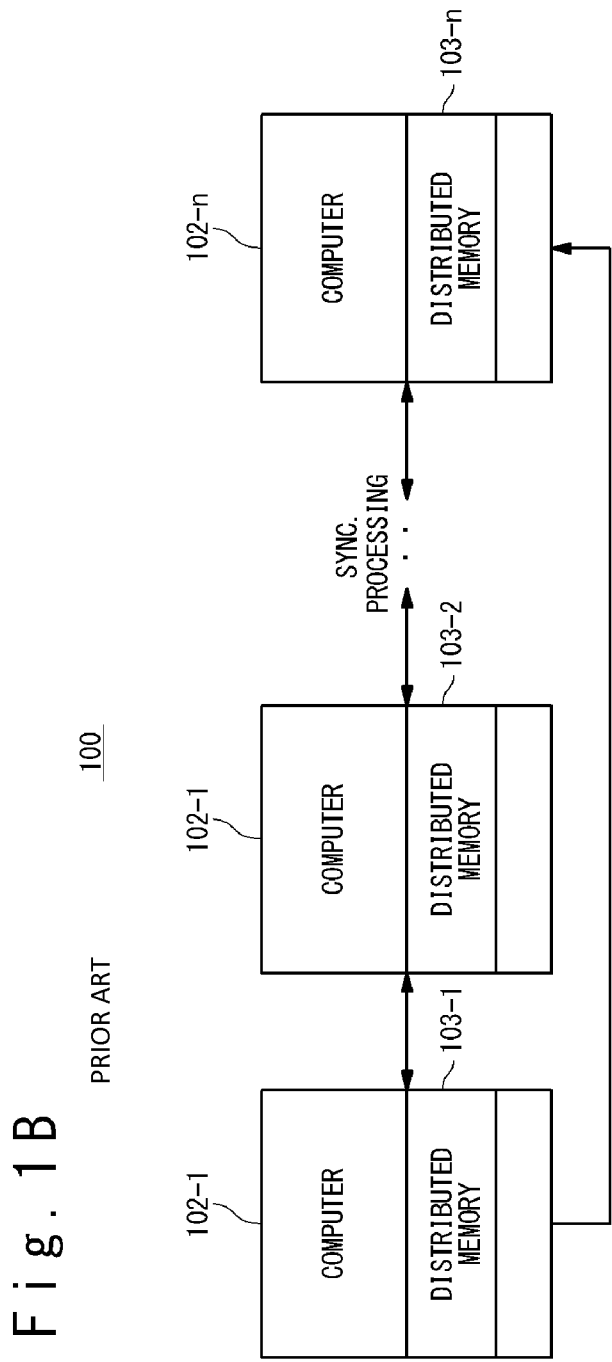
FIG. 1B is a conceptual diagram showing an example of a distributed memory type parallel processing system.

Embodiments of the present invention will be described below with reference to the attached drawings.

First Embodiment

FIG. 2 is a diagram schematically showing a parallel processing system 1 according to the present embodiment. As shown in FIG. 2, the parallel processing system 1 is composed of a plurality of computers 2-1 to 2-$n$, and these computers are connected through a network 3 to be accessible each other. A program which is executed by the parallel processing system 1 contains a plurality of processes. The plurality of processes are respectively allocated to and executed by the plurality of computers 2-1 to 2-$n$ in parallel.

Each of the plurality of computers 2-1 to 2-$n$ has a CPU (central processing unit) 4, a local memory group 5 and an I/O (input/output) control circuit 6. Also, a timer circuit 10 is provided in at least one of the plurality of computers 2-1 to 2-$n$. In the present embodiment, the timer circuit 10 is provided in the computer 2-1. The CPU 4, the local memory group 5, the I/O control circuit 6 and the timer circuit 10 are connected to each other through a bus. In each computer 2, the CPU 4 executes the allocated process by using data stored in the local memory group 5.

The timer circuit 10 generates a timer signal and has a function to supply it to a plurality of computers 2-1 to 2-$n$. A preset time is previously set to the timer circuit 10. Every time the preset time lapses, the timer circuit 10 generates and supplies the timer signal to the CPU 4 and the I/O control circuit 6. The timer signal is supplied to the I/O control circuit 6 and then is supplied to the other computers (2-2 to 2-$n$) through the network 3. In each of the other computers (2-2 to 2-$n$), the timer signal is supplied to the CPU 4 through the I/O control circuit 6.

Figure 3:
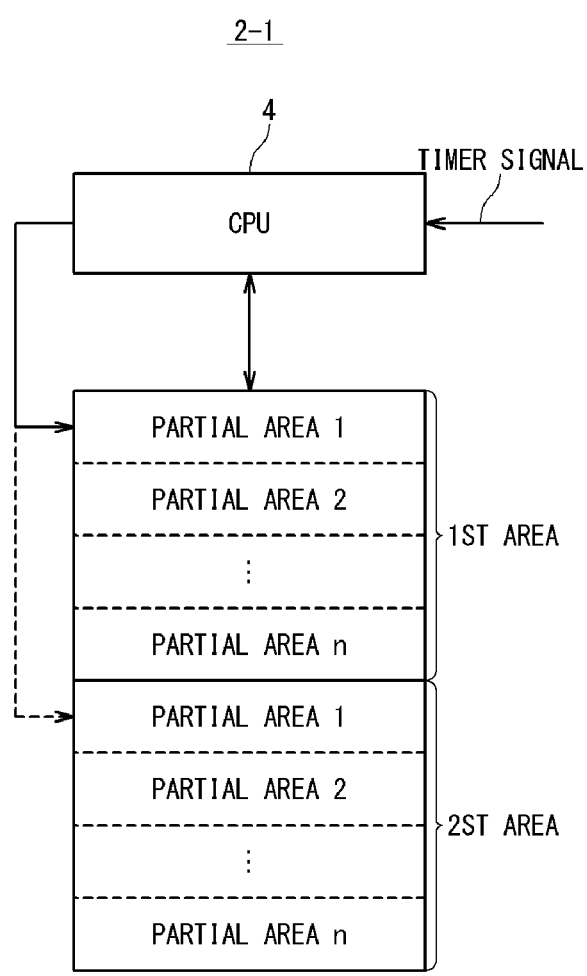
FIG. 3 is a conceptual diagram showing a memory space of a CPU in each computer.

The local memory group 5 has a first area and a second area. FIG. 3 is a conceptual diagram showing the memory space of the CPU 4 in each computer 2. As shown in FIG. 3, in the memory space, the first area and the second area are allocated for the separate areas.

A plurality of partial areas are set to each of the first area and the second area. The plurality of partial areas are respectively provided for the plurality of computers 2-1 to 2-$n$.

The CPU 4 executes an allocated process by using either of the first area and the second area area as an access destination and writes the execution result of the allocated process in could the partial area corresponding to its own computer. For example, in the computer 2-1, the CPU 4 writes an execution result of the allocated process in the partial area 1 (the partial area corresponding to the computer 2-1) of the first area or the second area. Also, the CPU 4 is configured to switch the access destination between the first area and the second area every time the timer signal is received. That is, every time the preset time lapses, the CPU 4 switches the area as the access destination.

Referring to FIG. 2 again, the I/O control circuit 6 is connected with the network 3 and has a function to carry out the transmission and reception of data to and from the other computers 2. As shown in FIG. 2, the I/O control circuit 6 is provided with an updating section 7. The updating section 7 has a function to communicate with the other computers 2 to update the data stored in the local memory group 5 to the latest data.

Next, an operating method of the parallel processing system 1 will be described.

Figure 4:
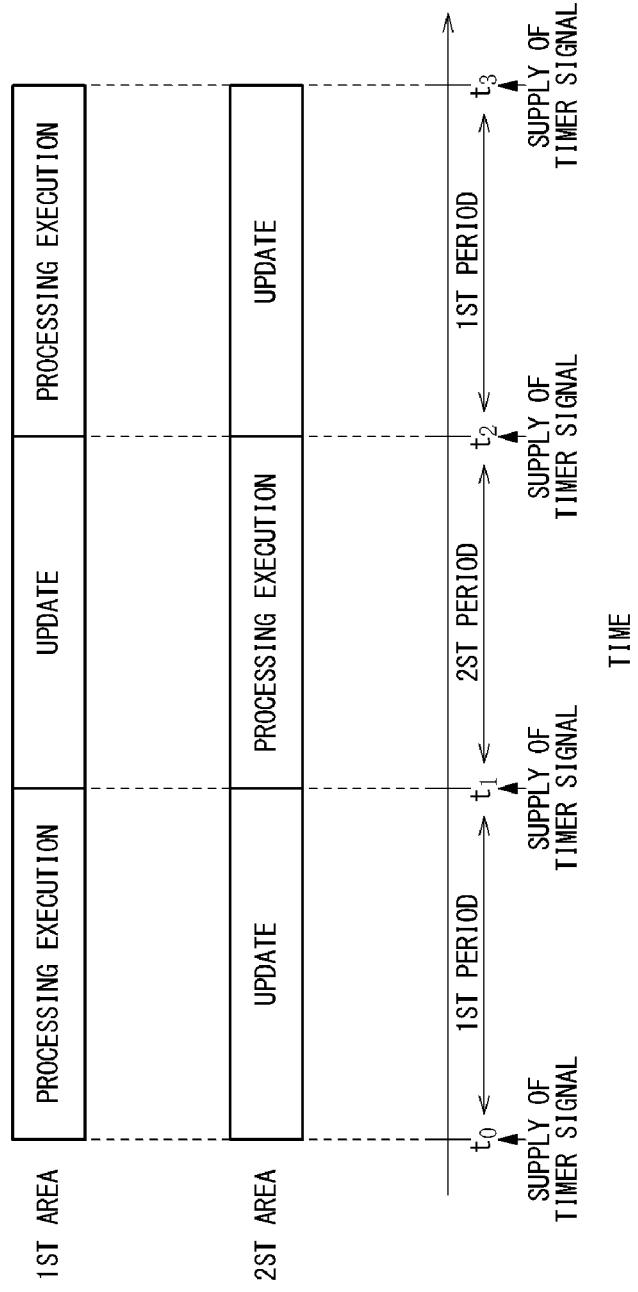
FIG. 4 is a diagram showing a method of operating the parallel processing system.

FIG. 4 is a diagram showing the operating method of the parallel processing system 1. FIG. 4 shows a relation between time and process to the first area and the second area. In FIG. 4, at first, the time when the timer circuit 10 generates and supplies the timer signal is shown as time t0. The time when the timer signal is supplied next to the time t0 is shown as time t1. The time when the timer signal is supplied next to the time t1 is shown as time t2. The time when the timer signal is supplied next to the time t2 is shown as time t3.

When the timer signal is supplied at time t0, the CPU 4 executes an allocated process by using the first area as the access destination during a period from the time t0 to the time t1 when the timer signal is supplied next. When the timer signal is supplied at time t1, the CPU 4 switches the access destination to the second area. That is, the CPU 4 executes the allocated process by using the second area as the access destination during a period from the time t1 to the time t2. When the timer signal is supplied at the time t2, the CPU 4 switches the access destination to the first area again. Then, the CPU 4 executes the process by using the first area as the access destination during a period (a first period) from the time t2 to the time t3, like the period from the time t0 to the time t1.

On the other hand, in the period from the time t0 to the time t1, the updating section 7 of the I/O control circuit 6 updates the data stored in the second area. Also, in the period from the time t1 to the time t2, the updating section 7 updates the data stored in the first area. Also, in the period from the time t2 to the time t3, the updating section 7 updates the data stored in the second area. That is, in the present embodiment, in the period (the first period) during which the CPU 4 executes the allocated process by using the first area as the access destination, the updating section 7 updates the data stored in the second area. Also, in the period (the second period) during which the CPU 4 executes the allocated process by using the second area as the access destination, the updating section 7 updates the data stored in the first area.

Figure 5B:
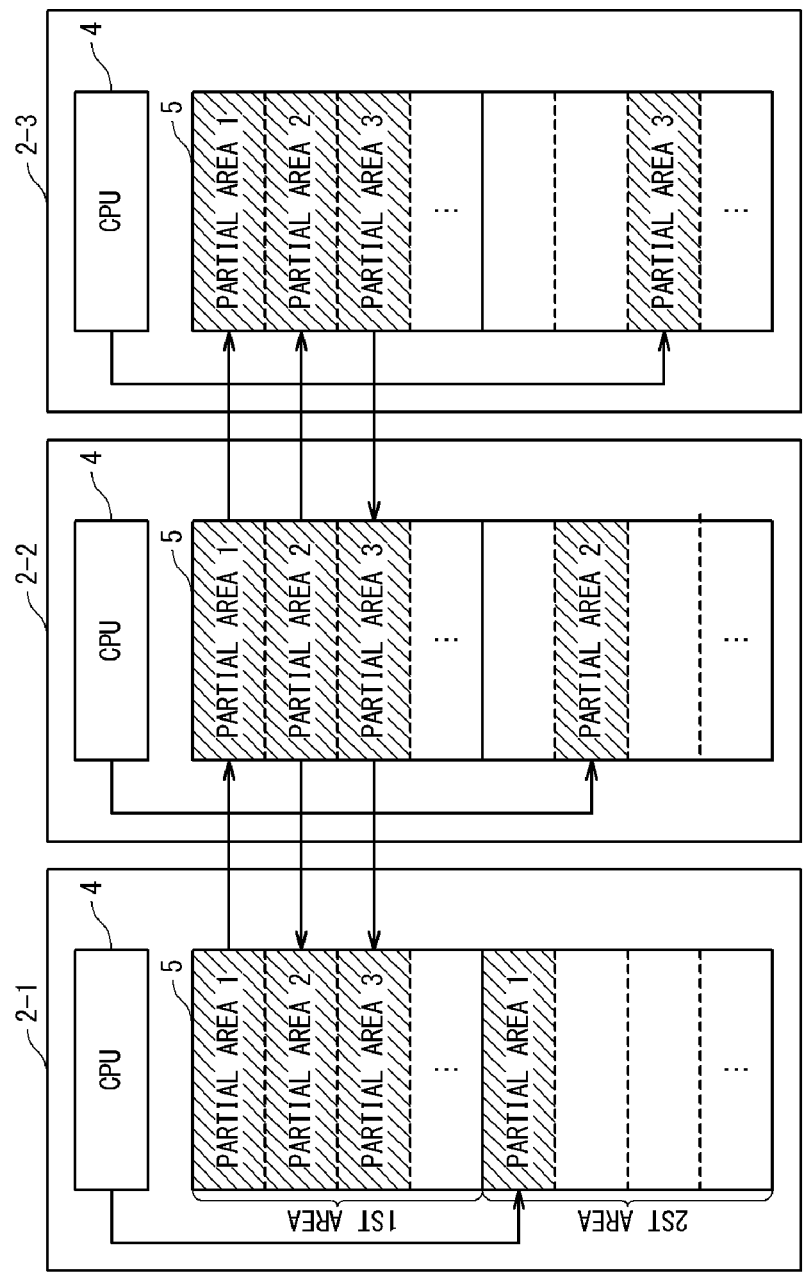
FIG. 5B is a diagram showing an operation example in a second period.

Referring to FIG. 5A and FIG. 5B, an operation example in the first period and the second period will be described in detail.

FIG. 5A is a diagram showing the operation example in the first period. FIG. 5A shows operation conditions of the computer 2-1, the computer 2-2 and the computer 2-3. As mentioned above, in the first period, the CPU 4 executes the allocated process by using the first area. As a result, in the example shown in FIG. 5A, the processing result is written in the partial area 1 (the partial area corresponding to the computer 2-1) of the first area in the computer 2-1. Also, in the computer 2-2, the processing result is written in the partial area 2 (a partial area corresponding to the computer 2-2) in the first area. Also, in the computer 2-3, the processing result is stored in the partial area 3 (a partial area corresponding to the computer 2-3) in the first area. On the other hand, the data stored in the second area is updated by the updating section 7.

FIG. 5B is a diagram showing an operation example in the second period. As mentioned above, in the second period, the data stored in the first area is updated by the updating section 7. That is, as shown in FIG. 5B, the data written in the partial area 1 of the first area of the computer 2-1 is copied to the partial area 1 of the first area in each of the computer 2-2 and the computer 2-3. In the same way, the data written in the partial area 2 of the first area in the computer 2-2 is copied on to the partial area 2 of the first area in each of the computer 2-1 and the computer 2-3. In the same way, the data written in the partial area 3 of the first area in the computer 2-3 is copied on to the partial area 3 of the first area in each of the computer 2-1 and the computer 2-2. Thus, the data stored in the first area in each computer 2 is updated to be the latest data. On the other hand, the CPU 4 executes the allocated process by using the second area. In the example shown in FIG. 5B, the CPU 4 writes the execution result of the process in the partial area 1 of the second area in the computer 2-1. Also, in the computer 2-2, the execution result of the process is written in the partial area 2 of the second area. In the computer 2-3, the execution result of the process is written in the partial area 3 of the second area. The data written in the second area of each computer 2 is copied to the second areas of the other computers in the next first period.

As described above, according to the present embodiment, while the allocated process is carried out by using the first area, the updating of the second area is carried out, and while the allocated process is executed by using the second area, the updating of the first area is carried out. Therefore, in each period, each computer 2 can execute the allocated process in a stand-alone condition and does not have to carry out a synchronizing process. Thus, the process performance can be improved without installing a complicated control function for the synchronizing process.

It should be noted that the present embodiment has been described in a case where the first area and the second area are provided in the local memory group 5 and the access destination is switched between the first period and the second period. Here, 3 or more areas may be provided in the local memory group 5. In such a case, in the period when the allocated process is executed by using one area in each computer 2, the updating of the other areas is carried out. Even if such a configuration is adopted, the same effect as in the present embodiment can be attained.

Also, it is desirable that the first area and the second area are allocated to different memory devices. That is, it is desirable that the local memory group 5 is composed of a first memory device and a second memory device in each computer 2, that the first area is allocated to the first memory device and that the second area is allocated for the second memory device. If such a configuration is adopted, the CPU 4 is enough to access only the first memory device in the first period and to access only the second memory device in the second period. Therefore, the operation when the CPU 4 accesses each memory device and the operation when the updating section 7 accesses each memory device can be fully separated. It becomes possible that the memory access operation by the CPU 4 and the memory access operation by the updating section 7 do not compete and the process performance can be improved more.

Second Embodiment

Figure 6:
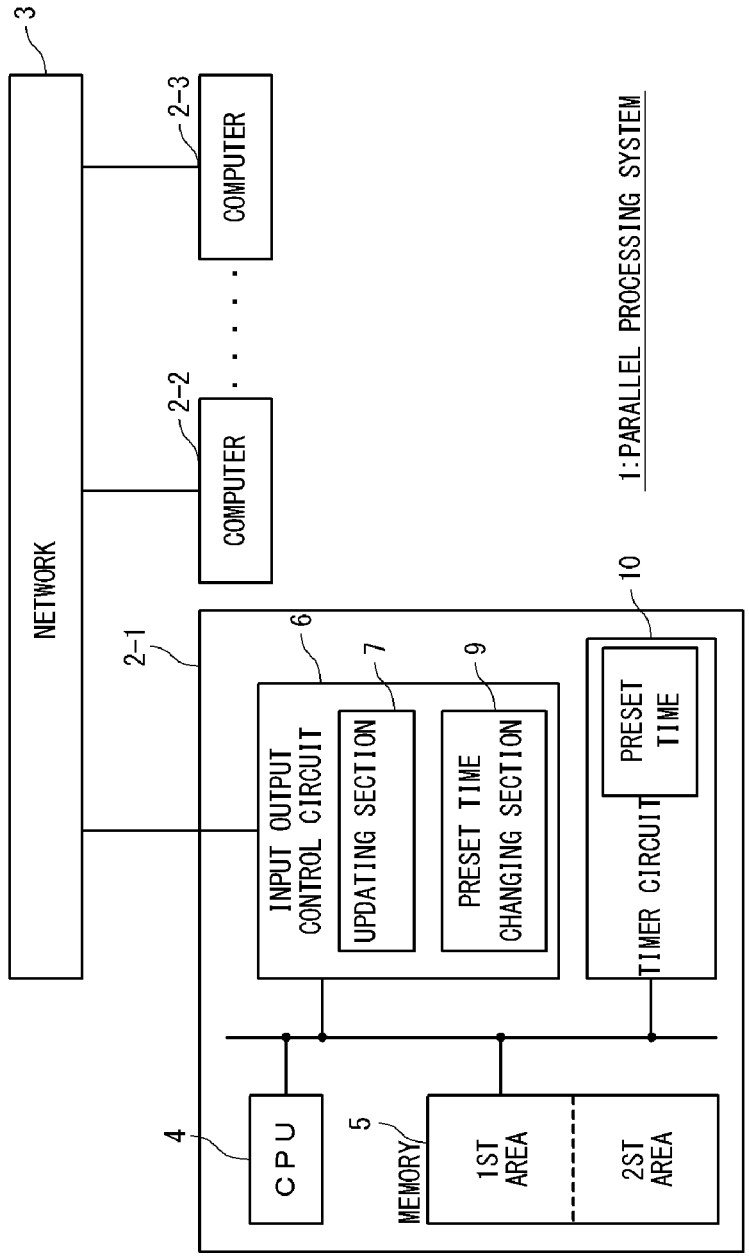
FIG. 6 is a diagram schematically showing the parallel processing system according to a second embodiment.

Next, a second embodiment of the present invention will be described. FIG. 6 is a diagram schematically showing the parallel processing system 1 according to the present embodiment. As shown in FIG. 6, in the present embodiment, a preset time changing section 9 is added to the I/O control circuit 6. Because the second embodiment has the same configuration as in the first embodiment in the other points, the detailed description will be omitted.

The preset time changing section 9 has a function to change the preset time set to the timer circuit 10. For example, the preset time changing section 9 changes the setting of the timer circuit 10 in response to a preset time change instruction when receiving the preset time change instruction from a user through an input unit (not shown) which is connected with the network. In the following operation, the time length in each of the first period and the second period becomes a preset time after the change.

According to the present embodiment, the best preset time can be set according to the program executed in the parallel processing system 1. For example, a complicated process can be handled by making the preset time long. Also, it becomes possible to improve the real time processing performance by making the preset time short.

Third Embodiment

Next, a third embodiment of the present invention will be described. In the present embodiment, the CPU can change the partial area in which the execution result of the process is written, to another partial area in each computer 2. Because the third embodiment is the same configuration as in the above-mentioned embodiments except the other points, a detailed description is omitted.

Figure 7:
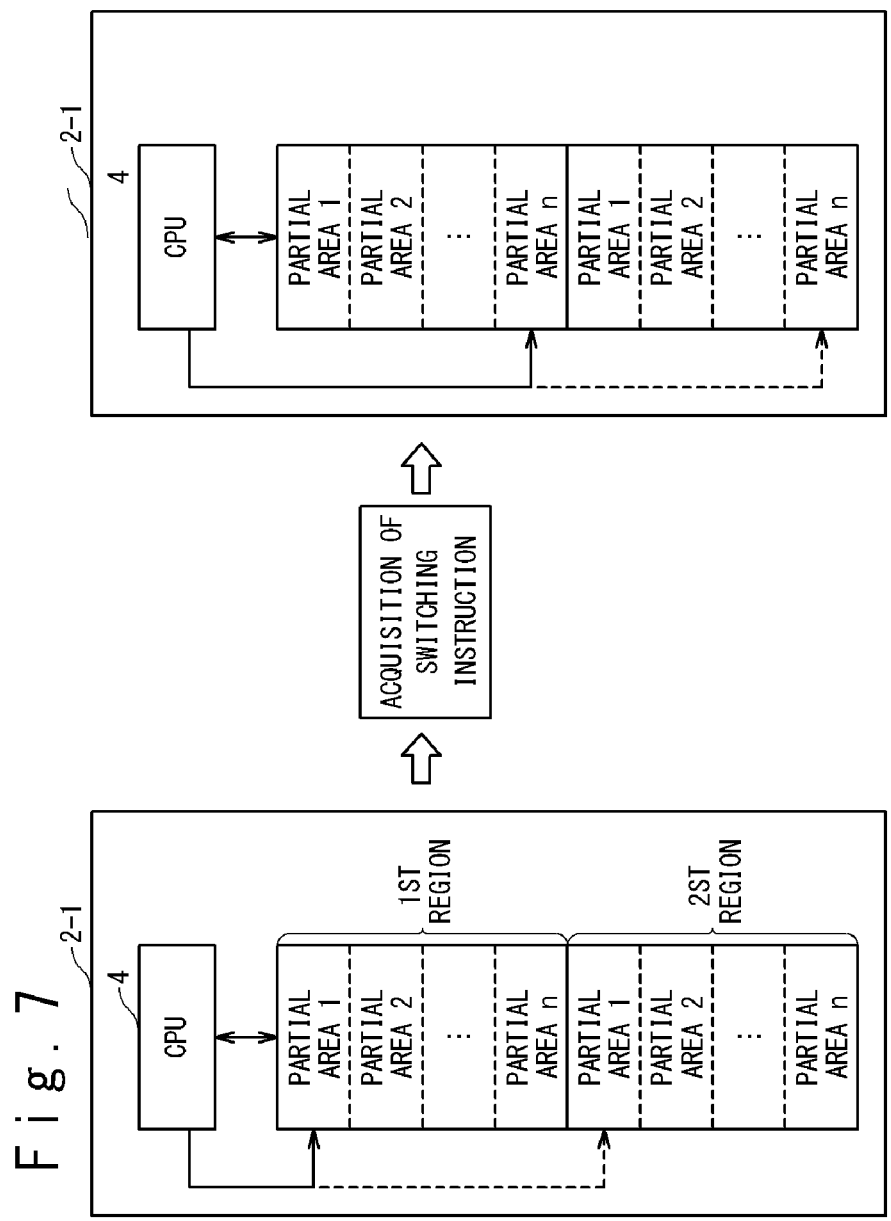
FIG. 7 is a diagram showing a method of operating the parallel processing system according to a third embodiment.

FIG. 7 is a diagram showing an operation method of the parallel processing system 1 according to the present embodiment. In each computer 2 of the present embodiment, a plurality of partial areas are provided in each of the first areas and second areas to correspond to all the computers 2. The configuration of the computer 2-1 is schematically shown in FIG. 7. As shown in FIG. 7, in the computer 2-1, the CPU 4 writes the execution result of the process in the partial area (partial area 1) corresponding to its own computer. Here, when the number of computers connected with the network 1 is changed, there is a case that each computer 2 is requested to function as the other computers. In such a case, in the present embodiment, an instruction requesting to change a partial area as the write destination is issued to the CPU 4 of each computer 2. For example, this instruction is issued by an input unit (not shown) connected with the network 1. In each computer 2, the CPU 4 updates (rewrites) a partial area as a write destination of the processing result in response to the received instruction. In an example shown in FIG. 7, the partial area as the write destination is changed from the partial area 1 to the partial area n in the computer 2-1. Thus, it becomes possible to make the computer 2-1 function as the computer 2-n According to the present embodiment, a plurality of partial areas are provided in each of the first area and second area to correspond to all the computers 2. Therefore, it becomes possible to make each computer 2 function as another computer connected with the network 1 by changing the partial area as the write destination of the processing result. Therefore, even if the number of computers 1 connected with the network 1 is changed, the parallel processing system 1 can operate without any contradiction. It becomes possible to provide the redundancy and extendibility easily for the parallel processing system 1.

Fourth Embodiment

Next, a fourth embodiment of the present invention will be described. In the present embodiment, the operation of the updating section 7 is modified. Because the fourth embodiment is same as in the first embodiment except that point, a detailed description is omitted.

Figure 8:
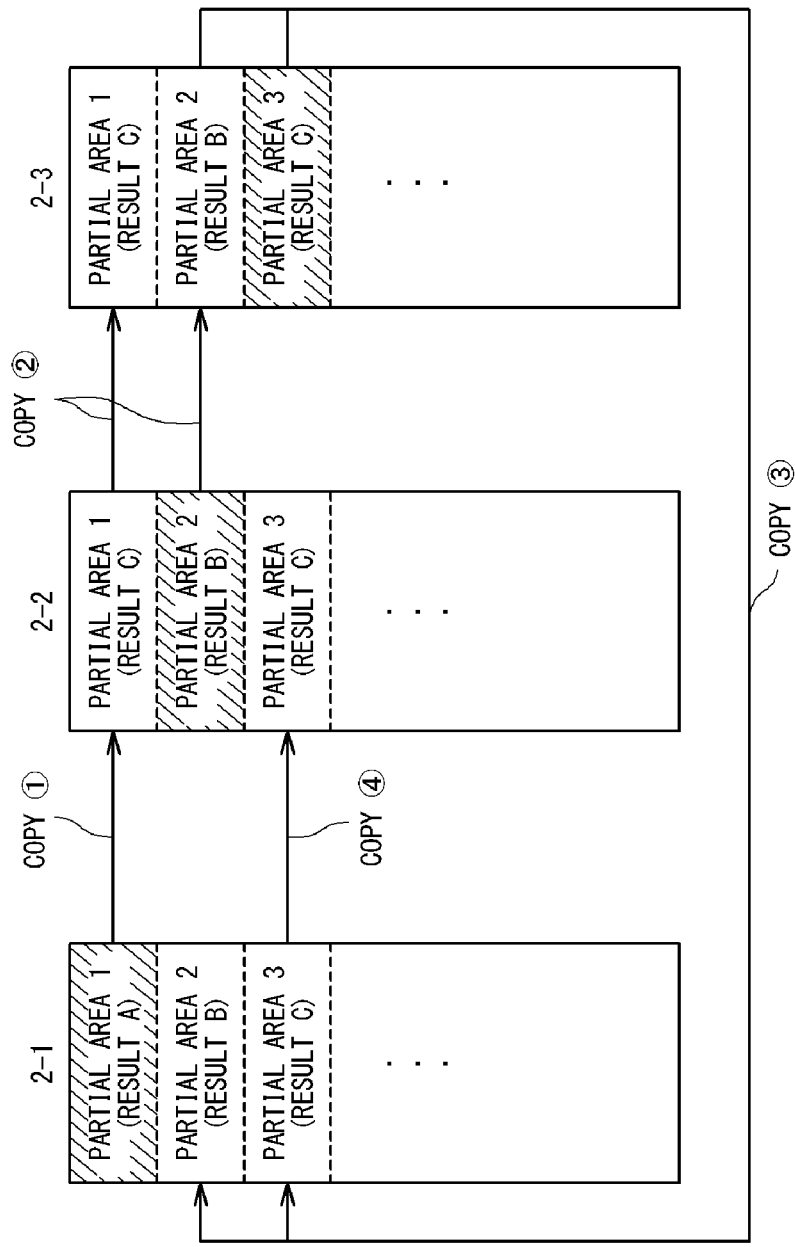
FIG. 8 is a diagram showing an example of an updating process.

In the present embodiment, the updating section 7 carries out an updating process such that a copy operation and a relay operation are executed among a plurality of computers 2. FIG. 8 is a diagram showing an example of the updating process. It should be noted that in the example shown in FIG. 8, the number of computers 2 connected with the network 1 is three. The conditions of the first areas of the computer 2-1, the computer 2-2 and the computer 2-3 are shown in FIG. 8. It is supposed that in the first period in the example shown in FIG. 8, a processing result A is written in the partial area 1 for the computer 2-1, a processing result B is written in the partial area 2 for the computer 2-2, and a processing result C is written in the partial area 3 for the computer 2-3 (slanted line portion in FIG. 8). In this case, in the second period, the data (the processing result A) written in the partial area 1 is first copied from the computer 2-1 to the computer 2-2. Next, the data (the processing result A and the processing result B) written in the partial area 1 and the partial area 2 are copied from the computer 2-2 to the computer 2-3. Next, the data (the processing results B and C) written in the partial area 2 and the partial area 3 are copied from the computer 2-3 to the computer 2-1. Next, the data (the processing result C) written in the partial area 3 is copied from the computer 2-1 to the computer 2-2. Thus, the processing results A to C are stored in the first area in the computers 2 so that the first area is updated to the latest data. The operation of updating the second area is same.

According to the present embodiment, the data stored in the local memory group 5 are copied (in order) to be relayed among the plurality of computers 2. Therefore, even if the number of computers 2 connected with the network 1 is changed, the data stored in the local memory group 5 can be easily unified for all the computers 2.

The first to fourth embodiments of the present invention have been described. It should be noted that these embodiments are not independent and can be used by combining them in a range that there is not contradiction.

This application claims a priority based on Japanese Patent Application (JP 2011-073163) filed for on Mar. 29, 2011. The disclosure of the application is incorporated herein by reference.

The invention claimed is:

1. A parallel processing system, comprising:
a network;
first to n-th computers accessibly connected with each other through the network to distributedly execute a plurality of processes, n being an integer of two or more,
wherein each of the first to n-th computers includes:
an operation processing unit configured to execute a process, from among the plurality of processes, allocated to the computer;
a local memory group including a first area and a second area; and
an I/O control circuit including an updating section,
wherein in each of the first to n-th computers, each of the first area and the second area includes a plurality of partial areas, first to n-th partial areas of the plurality of partial areas being respectively associated with the first to n-th computers,
wherein for i being any integer from one to n, the operation processing unit in an i-th computer of the first to n-th computers, during a first period, (i) executes the allocated process by using the first area of the i-th computer as an access destination and (ii) writes an execution result of the allocated process into the i-th partial area of the first area of the i-th computer,
wherein for i being any integer from one to n, the updating section of the i-th computer updates data stored in the first area of the i-th computer during a second period so that the same data is stored in the first area of each of the first to n-th computers after the update of the data stored in the first area of each of the first to n-th computers during the second period, and
wherein in the update of the data stored in the first area of the first to n-th computers during the second period, data stored in the i-th partial area of the first area of the i-th computer is copied to the i-th partial area of the first area of each of the first to n-th computers other than the i-th computer.

2. The parallel processing system according to claim 1, wherein in each of the first to n-th computers, the I/O control circuit of the computer further includes a preset time changing section configured to change a length of the first period.

3. The parallel processing system according to claim 1, wherein for i being any integer from one to n, the operation processing unit of the i-th computer switches a write destination of the execution result of the allocated process from the i-th partial area of the first area of the i-th computer to a newly associated one of the plurality of partial areas of the first area of the i-th computer.

4. A parallel processing system, comprising:
a network;
first to n-th computers accessibly connected with each other through the network to distributedly execute a plurality of processes, n being an integer of two or more,
wherein each of the first to n-th computers includes:
an operation processing unit configured to execute a process, from among the plurality of processes, allocated to the computer;
a local memory group including a plurality of areas, the plurality of areas including a first area and a second area; and
an I/O control circuit including an updating section,
wherein in each of the first to n-th computers, each of the plurality of areas includes a plurality of partial areas, first to n-th partial areas of the plurality of partial areas being respectively associated with the first to n-th computers,
wherein for i being any integer from one to n, the operation processing unit in an i-th computer of the first to n-th computers (i) executes, during a first period, the allocated process by using the first area of the ith-computer as an access destination, (ii) writes, during the first period, an execution result of the allocated process into the i-th partial area of the first area of the i-th computer, and (iii) switches, after the first period expires, the access destination to the second area of the i-th computer,
wherein for i being any integer from one to n, the operation processing unit in the i-th computer (i) executes, during a second period following the first period, the allocated process by using the second area of the ith-computer as the access destination and (ii) writes, during the second period, an execution result of the allocated process into the i-th partial area of the second area of the ith-computer,
wherein for i being any integer from one to n, the updating section of the i-th computer updates data stored in the first area of the i-th computer during the second period so that the same data is stored in the first area of each of the first to n-th computers after the update of the data stored in the first area of each of the first to n-th computers during the second period, and
wherein in the update of the data stored in the first area of the first to n-th computers during the second period, data stored in the i-th partial area of the first area of the i-th computer is copied to the i-th partial area of the first area of each of the first to n-th computers other than the i-th computer.

5. An operation method of a parallel processing system which includes first to n-th computers accessibly connected with each other through a network, n being an integer of two or more,
wherein each of the first to n-th computers includes:
an operation processing unit configured to execute a process, from among a plurality of processes, allocated to the computer;
a local memory group including a first area and a second area; and
an I/O control circuit including an updating section, and
wherein in each of the first to n-th computers, each of the first area and the second area includes a plurality of partial areas, first to n-th partial areas of the plurality of partial areas being respectively associated with the first to n-th computers,
the operation method comprising:
for i being any integer from one to n, (i) executing, during a first period using the operation processing unit in an i-th computer of the first to n-th computers, the allocated process by using the first area of the i-th computer as an access destination and (ii) writing, during the first period using the operation processing unit in an i-th computer, an execution result of the allocated process into the i-th partial area of the first area of the i-th computer,
for i being any integer from one to n, updating, during a second period using the updating section of the i-th computer, data stored in the first area of the i-th computer so that the same data is stored in the first area of each of the first to n-th computers after the update of the data stored in the first area of each of the first to n-th computers during the second period, and
wherein in the update of the data stored in the first area of the first to n-th computers during the second period, data stored in the i-th partial area of the first area of the i-th computer is copied to the i-th partial area of the first area of each of the first to n-th computers other than the i-th computer.

6. An operation method of a parallel processing system which includes first to n-th computers accessibly connected with each other through a network, n being an integer of two or more,
wherein each of the first to n-th computers includes:
an operation processing unit configured to execute a process, from among a plurality of processes, allocated to the computer;
a local memory group including a plurality of areas, the plurality of areas including a first area and a second area; and
an I/O control circuit including an updating section,
wherein in each of the first to n-th computers, each of the plurality of areas includes a plurality of partial areas, first to n-th partial areas of the plurality of partial areas being respectively associated with the first to n-th computers,
the operation method comprising:
for i being any integer from one to n, (i) executes, during a first period using the operation processing unit in an i-th computer of the first to n-th computers, the allocated process by using the first area of the ith-computer as an access destination, (ii) writes, during the first period using the operation processing unit in the i-th computer, an execution result of the allocated process into the i-th partial area of the first area of the ith-computer, and (iii) switches, after the first period expires using the operation processing unit in the i-th computer, the access destination to the second area of the ith-computer,
for i being any integer from one to n, (i) executes, during a second period following the first period using the operation processing unit in the i-th computer, the allocated process by using the second area of the i-th computer as the access destination and (ii) writes, during the second period using the operation processing unit in the i-th computer, an execution result of the allocated process into the i-th partial area of the second area of the i-th computer,
for i being any integer from one to n, updating, during the second period using the updating section of the i-th computer, data stored in the first area of the i-th computer so that the same data is stored in the first area of each of the first to n-th computers after the update of the data stored in the first area of each of the first to n-th computers during the second period, and wherein in the update of the data stored in the first area of the first to n-th computers during the second period, data stored in the i-th partial area of the first area of the i-th computer is copied to the i-th partial area of the first area of each of the first to n-th computers other than the i-th computer.

7. The parallel processing system according to claim 1, wherein for i being any integer from one to n, the updating section of the i-th computer updates data stored in the second area of the i-th computer by carrying out communication among the first to n-th computers during the first period so that the same data is stored in the second area of each of the first to n-th computers after the update of the data stored in the second area of each of the first to n-th computers.

8. The operation method according to claim 5, further comprising:

for i being any integer from one to n, updating, using the I/O control circuit of the i-th computer, data stored in the second area of the computer by carrying out communication among the first to n-th computers during the first period so that the same data is stored in the second area of each of the first to n-th computers after the update of the data stored in the second area of each of the first to n-th computers.

* * * * *